US010808351B1

(12) United States Patent
Flachsbart et al.

(10) Patent No.: US 10,808,351 B1
(45) Date of Patent: Oct. 20, 2020

(54) APPLIANCE MONITORING SENSORS

(71) Applicant: United Services Automobile Association (USAA), San Antonio, TX (US)

(72) Inventors: Matthew Flachsbart, Grapevine, TX (US); Benjamin D. Ethington, Savannah, TX (US); Wayne M. Hartman, Chubbuck, ID (US); Kade L. Scott, Scottsdale, AZ (US)

(73) Assignee: United Services Automobile Association (USAA), San Antonio, TX (US)

(*) Notice: Subject to any disclaimer, the term of this patent is extended or adjusted under 35 U.S.C. 154(b) by 86 days.

(21) Appl. No.: 15/863,012

(22) Filed: Jan. 5, 2018

Related U.S. Application Data

(60) Provisional application No. 62/443,211, filed on Jan. 6, 2017.

(51) Int. Cl.
| | |
|---|---|
| F26B 13/10 | (2006.01) |
| D06F 58/30 | (2020.01) |
| G01K 3/00 | (2006.01) |
| G01K 13/00 | (2006.01) |
| D06F 58/02 | (2006.01) |
| D06F 34/28 | (2020.01) |
| D06F 58/50 | (2020.01) |
| D06F 101/00 | (2020.01) |
| D06F 105/58 | (2020.01) |

(52) U.S. Cl.
CPC ............. *D06F 58/30* (2020.02); *G01K 3/005* (2013.01); *G01K 13/00* (2013.01); *D06F 34/28* (2020.02); *D06F 58/02* (2013.01); *D06F 58/50* (2020.02); *D06F 2101/00* (2020.02); *D06F 2105/58* (2020.02)

(58) Field of Classification Search
CPC .. D06F 58/28; D06F 58/02; D06F 2058/2858; D06F 2058/2803; D06F 2058/2887; G01K 3/005; G01K 13/00
USPC .............. 34/528, 108, 595, 602; 340/539.24, 340/539.1, 531, 532, 539.11, 539.22, 340/693.6, 693.7, 3.32, 3.42, 4.34, 6.1
See application file for complete search history.

(56) References Cited

U.S. PATENT DOCUMENTS

| | | | | | |
|---|---|---|---|---|---|
| 3,644,912 | A | * | 2/1972 | Allen, Jr. ................ | G08B 13/22 340/538 |
| 3,706,952 | A | * | 12/1972 | Alley ..................... | H01H 37/60 337/348 |
| 4,385,452 | A | * | 5/1983 | Deschaaf ................ | D06F 58/30 34/562 |
| 5,315,765 | A | * | 5/1994 | Holst ...................... | D06F 58/20 219/707 |
| 5,923,253 | A | * | 7/1999 | Anastasiou .......... | G08B 25/016 128/903 |

(Continued)

*Primary Examiner* — John P McCormack

(74) *Attorney, Agent, or Firm* — Fish & Richardson P.C.

(57) ABSTRACT

Sensor units that includes a power source, a communication interface, and a sensor coupled to the power source and the communication interface. The sensor is calibrated to connect the power source to the communication interface upon an occurrence of a condition in an appliance. The sensor, thereby, permits the communication interface to transmit data indicating the condition to a computing device. Methods, systems, and apparatus, for monitoring such sensor units.

20 Claims, 4 Drawing Sheets

(56) References Cited

U.S. PATENT DOCUMENTS

| | | | |
|---|---|---|---|
| 8,217,752 B2* | 7/2012 | Kwon | D06F 33/02 |
| | | | 340/3.1 |
| 8,701,309 B2 | 4/2014 | Park et al. | |
| 8,782,922 B2* | 7/2014 | May | D06F 58/28 |
| | | | 34/491 |
| 9,206,543 B2* | 12/2015 | Morin | D06F 58/28 |
| 9,359,712 B2* | 6/2016 | Tuller | A47L 15/0047 |
| 10,012,971 B2* | 7/2018 | Pietsch | A47L 15/0063 |
| 2003/0067386 A1* | 4/2003 | Skinner | G08B 25/006 |
| | | | 340/540 |
| 2007/0124953 A1 | 6/2007 | Crnkovich | |
| 2007/0262863 A1* | 11/2007 | Aritsuka | H04B 17/27 |
| | | | 340/539.22 |
| 2008/0141553 A1* | 6/2008 | Son | D06F 58/203 |
| | | | 34/130 |
| 2010/0175898 A1 | 7/2010 | Steinicke | |
| 2011/0203131 A1* | 8/2011 | Armstrong | D06F 58/28 |
| | | | 34/572 |
| 2012/0144692 A1 | 6/2012 | Park et al. | |
| 2015/0124849 A1* | 5/2015 | Parthasarathy | G01N 25/72 |
| | | | 374/4 |
| 2015/0320609 A1* | 11/2015 | Thoen | A61F 13/42 |
| | | | 340/573.5 |
| 2017/0227405 A1* | 8/2017 | Bousquet | G01K 7/01 |

* cited by examiner

APPLIANCE MONITORING SENSORS

CROSS-REFERENCE TO RELATED APPLICATION

This application claims the benefit of the filing date of U.S. Provisional Application No. 62/443,211, filed on Jan. 6, 2017. The contents of U.S. Application No. 62/443,211 are incorporated herein by reference in their entirety.

BACKGROUND

Appliance malfunctions are a common cause of home fires. Specifically, fires in a home can be caused by lint build up in clothes dryers. Appliances can have sensors that monitor the operation of the appliance, however, the sensors are generally used for control of the appliance not monitoring for abnormal or hazardous operating conditions.

SUMMARY

Implementations of the present disclosure are generally directed to sensor units for detecting abnormal (e.g., unsafe) conditions in consumer appliances. More particularly, implementations of the present disclosure are directed sensor units for detecting unsafe conditions in clothes dryers, such as conditions that may result in a fire.

In general, innovative aspects of the subject matter described in this specification can be embodied in a sensor unit that includes a power source, a communication interface, and a sensor coupled to the power source and the communication interface. The sensor is calibrated to connect the power source to the communication interface upon an occurrence of a condition in an appliance. The sensor, thereby, permits the communication interface to transmit data indicating the condition to a computing device. This and other implementations can each optionally include one or more of the following features.

In some implementations, the sensor is calibrated to connect the power source to the communication interface upon an occurrence of a condition in a clothes dryer.

In some implementations, the data includes at least one of identity information of the sensor unit, a time stamp, or a set-point of the sensor.

In some implementations, the sensor is configured to disconnect the power source from the communication interface when the condition in the clothes dryer clears, thereby, causing the communication interface to cease transmitting the data indicating the condition.

In some implementations, the power source is one of a battery, a thermo-electric power source, a piezo-electric power source, a magnetic induction power source.

In some implementations, the sensor unit includes a housing that houses the power source, the communication interface, and the sensor. In some implementations, the housing is a dryer ball.

In some implementations, the sensor is a thermal switch or a pressure switch.

In some implementations, the condition is a dryer exhaust temperature above a threshold value, a dryer exhaust pressure above a threshold value, a temperature at a dryer thermostat above a threshold value, or a temperature inside a dryer drum above a threshold value.

In some implementations, the sensor has a set-point value and a reset-point value that is different from the set-point value.

In some implementations, the communication interface is a Bluetooth interface, a WiFi interface, a ZigBee interface, or a Z-wave interface.

In another general aspect, innovative aspects of the subject matter described in this specification can be embodied in methods that include the actions of receiving a data transmission from at least one clothes dryer sensor unit that indicates that the at least one sensing unit has been triggered. The data transmission can include identity information of the at least one sensor unit. Determining that a condition has occurred in a clothes dryer, based on having received the data. Identifying a user computing device that is registered to receive notifications related to a clothes dryer that is associated with the at least one sensor unit based on the identity information of the at least one sensor unit. Providing an electronic notification to correct an unsafe condition in the clothes dryer to the user computing device. Other implementations of this aspect include corresponding systems (e.g., monitoring systems), apparatus, and computer programs, configured to perform the actions of the methods, encoded on computer storage devices. These and other implementations can each optionally include one or more of the following features.

In some implementations, determining that a condition has occurred in the clothes dryer includes identifying a pattern of multiple discrete data transmissions from the at least one sensor unit, the pattern indicating that a heater in the clothes dryer is cycling in an abnormal pattern.

In some implementations, determining that a condition has occurred in the clothes dryer includes determining that data transmissions have been received from a predetermined number of different sensor units associated with the clothes dryer.

In some implementations, determining that a condition has occurred in the clothes dryer includes determining that data transmissions have been received from a predetermined set of different sensor units associated with the clothes dryer.

In some implementations, the notification includes a maintenance alert instructing the user to clear lint from an exhaust of the clothes dryer.

In some implementations, the operations further comprise receiving, from the user computing device, a user input to shut down the clothes dryer, and causing the clothes dryer to be shut down remotely. In some implementations, causing the clothes dryer to be shut down remotely comprises sending a command to a communication interface of the clothes dryer to shut down the dryer. In some implementations, the monitoring system is part of a control system of the clothes dryer and causing the clothes dryer to be shut down remotely comprises causing the control system of the clothes dryer to shut down the clothes dryer.

In another general aspect, innovative aspects of the subject matter described in this specification can be embodied in a monitoring hub for appliance sensing units. The monitoring hub includes a charging connection for a sensor unit, a communication interface, at least one processor coupled to the communication interface, and a data store coupled to the at least one processor. The data store has instructions stored thereon which, when executed by the at least one processor, causes the at least one processor to perform operations including receiving a data transmission from at least one sensor unit that indicates that the at least one sensing unit has been triggered. The data transmission includes an ID of the at least one sensor unit. Determining that a condition has occurred in the appliance based on having received the data. Providing an electronic notification to correct an unsafe condition in the appliance to a user computing device registered to receive notifications from the monitoring hub. Other implementations of this aspect include corresponding systems, apparatus, and computer programs, configured to perform the actions of the methods, encoded on computer storage devices. These and other implementations can each optionally include one or more of the following features.

In some implementations, the appliance is a clothes dryer.

In some implementations, determining that a condition has occurred in the appliance includes identifying a pattern of multiple discrete data transmissions from the at least one sensor unit, the pattern indicating that a heater in the clothes dryer is cycling in an abnormal pattern.

In some implementations, determining that a condition has occurred in the appliance includes determining that data transmissions have been received from a predetermined number of different sensor units associated with the clothes dryer.

In some implementations, determining that a condition has occurred in the appliance includes determining that data transmissions have been received from a predetermined set of different sensor units associated with the appliance.

In some implementations, the notification includes a maintenance alert instructing the user to clear lint from an exhaust of the appliance.

In some implementations, the operations include receiving, from the user computing device, a user input to shut down the appliance, and causing the clothes dryer to be shut down remotely. In some implementations, causing the appliance to be shut down remotely includes sending a command to a communication interface of the appliance to shut down the appliance.

These and other implementations can provide one or more advantages. In some examples, implementations of the present disclosure enable improved monitoring of the operation of home appliances. Implementations provide notifications of appliance malfunctions or hazardous operation conditions and may permit a user to remotely shutdown an appliance to correct a hazardous situation. Implementations provide appliance monitoring sensors that use minimal amounts of power. Implementations provide appliance monitoring sensors that generate power from the normal operation an appliance.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to sensor units for detecting abnormal (e.g., unsafe) conditions in consumer appliances. More particularly, implementations of the present disclosure are directed to sensor units for detecting unsafe conditions in clothes dryers, such as conditions that may result in a fire. One example, sensor unit includes a power source, a communication interface, and a sensor based trigger. The trigger is configured to supply power to the communication interface upon the occurrence of an abnormal condition. The communication interface transmits an alert to notify a user of a potentially unsafe condition. For example, the alert may be an ID of the sensor unit, and is only transmitted upon the detection of a particular abnormal condition (e.g., a high temperature at the exhaust of a clothes dryer). Thus, the transmission of the alert indicates the occurrence of the abnormal condition. The ID may be transmitted directly to a user's computing device (e.g., through a household WiFi network) and processed by an application executed by the computing device to inform the user of a potentially unsafe condition in the user's clothes dryer (e.g., a potential fire due to lint build up).

Other aspects of the present disclosure relate to a system for processing data from appliance sensors, such as those described herein. In some implementations, the alert can be transmitted to a third-party system for processing. For example, a back-end system can perform detailed analyses on data obtained from multiple sensors associated with the user's dryer. For example, the back-end system may require a particular number of sensors or particular combinations of sensors to trigger before sending an alert to the user's computing device. For example, data from multiple sensors units, such as a dryer exhaust pressure sensor unit, a dryer exhaust temperature sensor unit, and a dryer thermostat sensor unit may provide a more accurate indication of a potential fire hazard in a user's dryer. In such examples, the third-party system may only alert the user, if two out of the three sensor units trigger on abnormal conditions.

Implementations of the present disclosure will be described in further detail with reference to an example context. The example context includes monitoring operating characteristics of a household clothes dryer. It is contemplated, however, that implementations of the present disclosure can be used in other appropriate appliances. For example, implementations of the present disclosure may be used in industrial drying equipment (e.g., at laundromats, drycleaners, hotels, cleaning services, etc.). Implementations, of the present disclosure may be used or adapted for use with other types household or industrial appliances or equipment (e.g., ovens, range hoods, deep fryers, central vacuum systems, HVAC systems, etc.).

Figure 1:
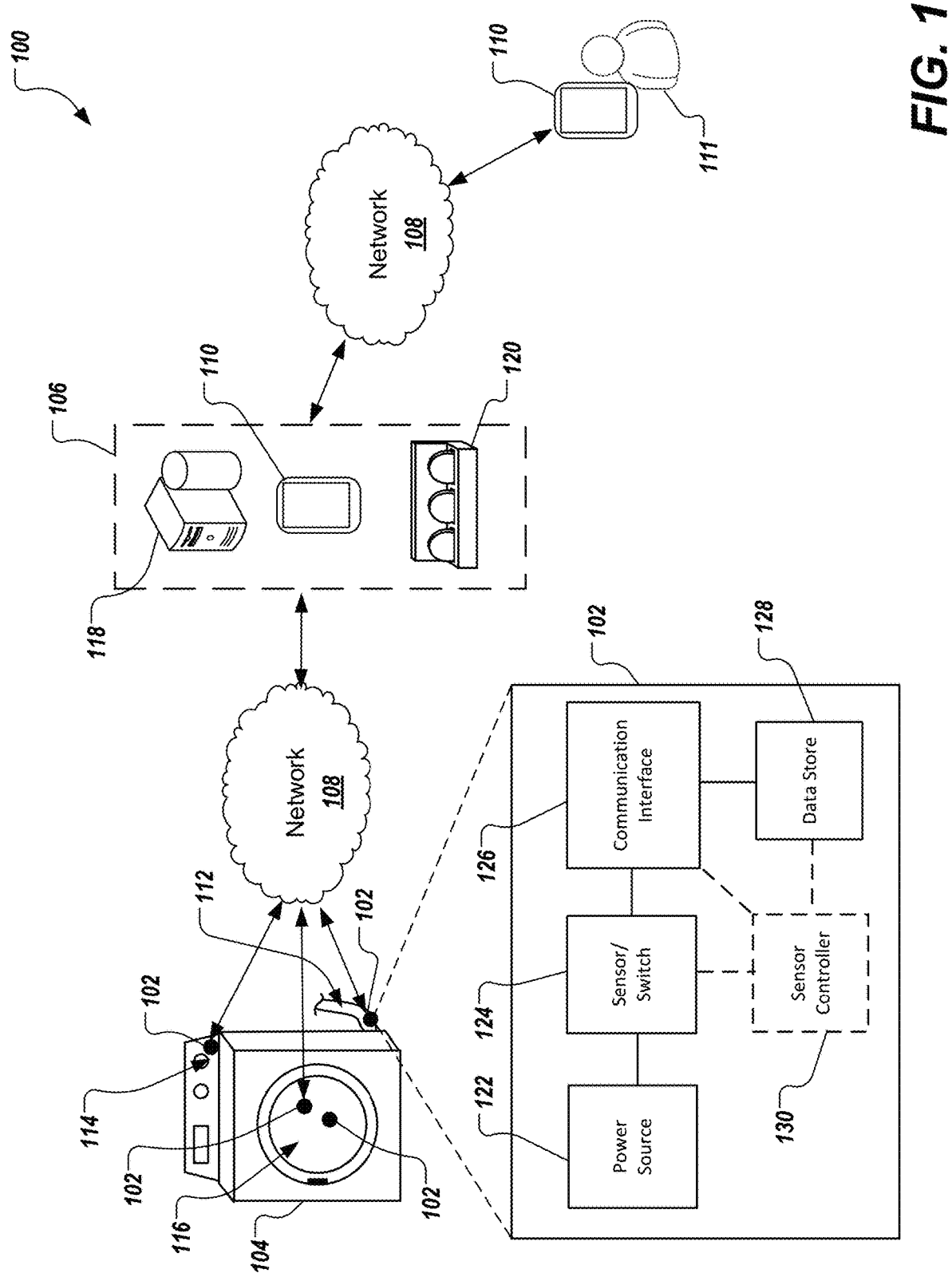
FIG. 1 depicts an example system in accordance with implementations of the present disclosure.

FIG. 1 depicts an example system 100 that can execute implementations of the present disclosure. The system 100 includes a one or more sensor units 102, a dryer 104, a data processing system (DPS) 106, network 108, and a user computing device 110.

The sensor units 102 are calibrated to detect conditions, such as temperature or pressure in the dryer 104. For example, a sensor unit 102 can be calibrated to detect a condition in the dryer 104 that exceeds a threshold value, such as a calibration set-point of the sensor. Furthermore, each sensor unit 102 may be calibrated to detect a different condition (e.g., a different temperature or pressure value) related to the operation of the dryer 104. For example, a sensor unit 102 calibrated to measure dryer exhaust temperature, pressure, airflow or a combination thereof can be installed in a dyer exhaust tube 112. A sensor unit 102 calibrated to measure dryer temperature at a dryer thermostat can be installed near the dryer's thermostat 114. A sensor unit 102 calibrated to measure temperature and/or humidity in a dryer drum can be placed inside the dryer drum 116.

In some implementations, one sensor unit 102 can be calibrated to measure multiple conditions of a dryer 104. For example, one sensor unit 102 can be calibrated to detect multiple set-points (e.g., two or more temperature or pressure set-points). As another example, one sensor unit 102 (such as the sensor unit installed at the dryer exhaust 112) can be configured to measure a dryer exhaust temperature and pressure. The sensor unit 102 can be calibrated to detect one or more temperature set-points and one or more pressure set-points.

The DPS 106 processes data from one or more sensor units 102 to detect abnormal conditions in the dryer 104 and inform a user 111 of such conditions. The DPS 106 can be a backend system 118, such as a server system. The DPS 106 can be a software application executed by a user computing device 110. The user computing device 110 can include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. The DPS 106 can be a sensor hub 120 (described in more detail below in reference to FIG. 2).

The sensor units 102 are configured to communicate data to the DPS 106 upon detecting the condition for which each sensor unit 102 is calibrated. For example, when a sensor unit 102 at the dryer exhaust 112 detects a dryer exhaust temperature greater than the sensor unit's 102 set-point the sensor unit 102 commences communicating data to the DPS 106 through network 108. The data can include, but is not limited to, identity information of the sensor unit (e.g., a serial number), time data (e.g., a time at which the data is transmitted), and the set-point of the sensor unit 102.

The DPS 106 processes the data received from the sensor unit 102 and, selectively, provides a notification about the dryer's 104 operation to a user 111. The notification can include, but is not limited to, a notification that the dryer requires service, a notification that the a potentially hazardous condition exists, or a notification that the dryer is malfunctioning. In some implementations, the DPS 106 (e.g., a backend system 118 or a sensor hub 120) can send an appropriate notification to a user's computing device 110. For example, data from one or more sensor units 102 may indicate that the dryer 104 requires maintenance, e.g., clearing lint from the dryer exhaust 112 or replacing a thermostat 114. In such an example, the DPS 106 can provide a notification advising the user 111 to perform the required maintenance.

The DPS 106 can include a database that relates sensor unit identification data (e.g., serial numbers) to various characteristics of each sensor unit 102. The sensor unit characteristics can include, but are not limited to, sensor type (e.g., pressure, temperature, humidity, airflow, etc.), dryer condition(s) that the sensor unit is configured to monitor (e.g., exhaust pressure/temperature/airflow, drum temperature/humidity/airflow, or thermostat temperature), a type of dryer that the sensor unit is configured to monitor (e.g., dryer make and model), sensor unit set-points, sensor unit reset-points, and identification data for a user computing device 110 associated with the sensor unit 102. Identification data for a user computing device 110 can include, for example, network address information for a user computing device 110 to which notifications are to be sent and/or e-mail information for an owner of the sensor unit 102.

As another example, the data from one or more sensor units 102 may indicate that a hazardous condition (e.g., a potential fire condition) exists. In such an example, the DPS 106 can provide a notification advising the user 111 to shut down the dryer 104. In some implementations, the dryer 104 may be a smart appliance, such as an internet connected appliance. In such implementations, the DPS 106 can send a command to the dryer 104 causing the dryer 104 to automatically shut down. The DPS 106 can send a notification to the user confirming that the dryer 104 was shut down in response to the sensor unit data indicating a potentially hazardous condition. In some implementations, the notification may permit the user 111 to remotely shut down the dryer 104. For example, if the dryer 104 is a smart dryer the notification can include a user selectable input permitting the user to choose whether to remotely shut down the dryer 104. Upon receiving a user selection to shut down the dryer, the DPS 106 can send an appropriate command to the dryer to shut down.

In more detail, a sensor unit 102 includes a power source 122, a sensor 124, a communication interface 126, a data store 128, and, optionally, a sensor controller 130. The power source 122 can include, but is not limited to, a battery, a thermo-electric power source (e.g., a Peltier tile), a piezo-electric power source, a magnetic induction power source, or an electrical connection to the dryer's 104 power source or other external power.

The sensor 124 is calibrated to detect a particular condition or conditions in a dryer 104 and, in response to detecting the condition or conditions, permit power to be supplied by the power source 122 to the communication interface 126. The sensor 124 can be a passive device, such as a switch-type sensor which, when triggered, creates an electrical connection between the power source 122 and the communication interface 126. For example, the sensor 124 can be a temperature, pressure, or humidity sensor that is calibrated to close a mechanical or electrical switch in response to sensing a respective temperature, pressure, or humidity above (or below) a calibrated set-point.

Figure 3A:
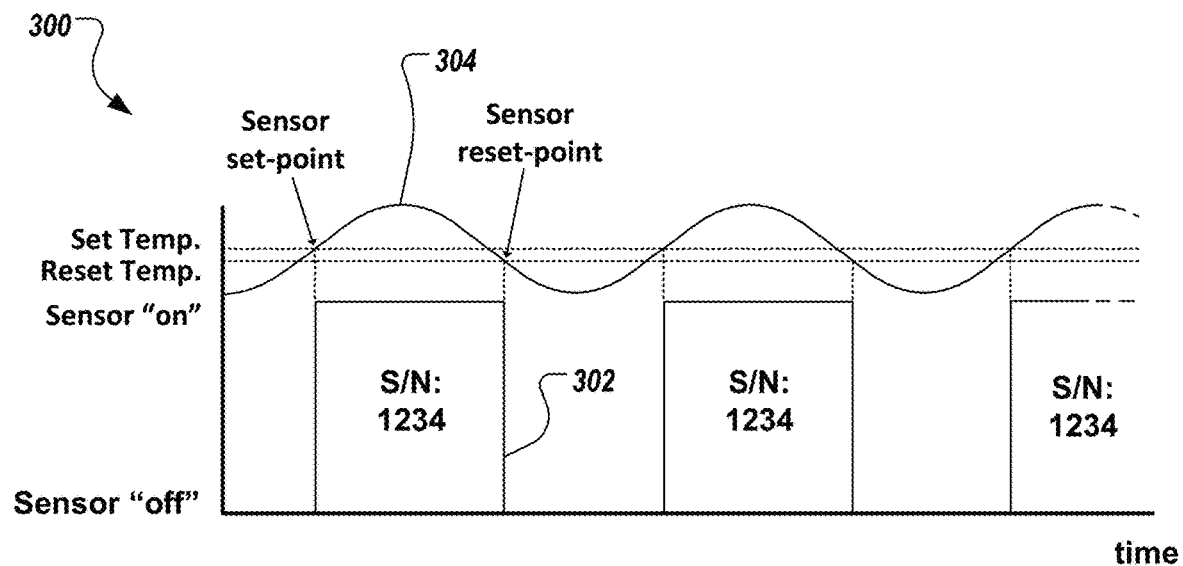
FIGS. 3A and 3B depict example graphs of sensor unit transmission patterns in accordance with implementations of the present disclosure

For example, the sensor 124 can be a thermal switch that turns on (e.g., closes an electrical contact or turns on an electrical switch, such as a transistor) above (or below) a particular temperature set-point at which the thermal switch is calibrated. Furthermore, the sensor 124 can be configured to reset (e.g., open an electrical contact or turn off an electrical switch) at a temperature reset-point slight lower (or higher) than the temperature set-point. Thus, the sensor 124 can include built in hysteresis to avoid rapid cycling of the sensor's switch at or near the set/reset-point. FIG. 3A shows a graph 300 of an example triggering pattern 302 for a dryer 104. The graph 300 also shows an example temperature profile 304 of the dryer 104 that that causes the sensor 124 within the sensor unit 102 to generate the triggering pattern 302 by causing the sensing unit 102 to turn "on" and "off" As illustrated, the sensor unit 102 begins transmitting a sensor serial number (e.g., serial number 1234) at temperature set-point (e.g., sensor 124 is triggered) and ceases transmitting at a reset-point (e.g., sensor 124 resets) that is less than the set-point.

It should be appreciated that the illustrated example is for a sensor 124 configured to detect high temperatures (e.g., temperatures above the set-point) or high pressures, however, a sensor 124 configured to detect low temperatures (or low pressures) would have a reset-point that is higher than the respective set-point. That is, in a sensor 124 configured to detect low temperatures (or low pressures) the set-point and reset-point illustrated in FIG. 3A would be swapped.

Referring again to FIG. 1, the communication interface 126 is a network interface that permits the sensor unit 102 to communicate through network 108 with the DPS 106. The communication interface 126 can be a wireless network interface configured to communicate using one or more network protocols including, but not limited to, WiFi, Bluetooth, ZigBee, or Z-wave. The communication interface 126 is disconnected from the power supply 122 until the sensor 124 is triggered. When the communication interface 126 is activated, e.g., by receiving power from the power source 122, the communication interface 126 transmits data from the data store 128 to the DPS 106 when the sensor 124 is triggered. The data store 128 stores data related to the particular sensor unit 102 including, but not limited to, identity information (e.g., serial number) of the sensor unit 102, a set-point of the sensor 124, a reset-point of the sensor 124.

Accordingly, the sensor unit 102 can operate by turning the communication interface 126 "off" and "on" as the sensor 124 detects conditions of the dryer 104 that meet the set/reset-points of the sensor 124. The DPS 106 receives and analyzes the data from the sensing unit 102 to determine the operational condition of the dryer 104. For example, in some implementations, the sensing unit 102 may transmit only its serial number when the sensor 124 of the sensing unit 102 is triggered. By receiving the serial number of the sensing unit 102, the DPS 106 can determine the operational condition of the dryer 104 by matching the serial number of a triggered sensing unit 102 to a set-point associated with the sensing unit.

The DPS 106 can determine that the conditions in the dryer 104 are at or exceed the set-point of the triggered sensor unit 102 based on receiving a data transmission from the sensing unit 102. The DPS 106 can then send a notification to the user 111. The DPS 106 may selectively send notifications based on a condition of the dryer indicated by the triggered sensor unit(s) 102. For example, the DPS 106 can determine an operational condition of the dryer based on the type/location of a sensor unit 102 triggered, the number of sensor units 102 triggered, a particular set of sensor units 102 triggered, a pattern with which a sensor unit 102 is triggered, or any combination thereof. The DPS 106 can then determine whether or not to send a notification, for example, if the determined condition is abnormal or hazardous. Furthermore, the DPS 106 can select an appropriate notification to send to the user computing device 110 based on the determined operational condition. For example, if the determined condition is hazardous (e.g., a potential fire hazard), the DPS 106 can send a notification with a high priority or urgency to ensure the user receives and acts on the notification. In some implementation, if the determined condition is hazardous (e.g., a potential fire hazard), the DPS 106 can send a notification that includes an option to shutdown the dryer 104.

When a sensor unit 102 is triggered, the DPS 106 can correlate the serial number of the triggered sensor to an entry in a sensor database to determine the type of sensor triggered (e.g., pressure or temperature) and the location that the sensor is installed in the dryer 104. For example, only one sensor indication (e.g., a high exhaust pressure indication) may be needed to determine when a dryer's exhaust 112 is clogged with lint. If the DPS 106 determines that a dryer exhaust 112 pressure sensor unit 112 has been triggered, the DPS 106 can send a notification to clean the dryer exhaust 112 to a user computing device 110.

In some implementations, the DPS 106 can generate a notification when a threshold number of sensor units 102 installed in the same dryer 104 are triggered. The DPS 106 can correlate the serial numbers of triggered sensor units 102 to a dryer 104 or a registered user computing device 110 based on information in the sensor database at the DPS 106. For example, a dryer malfunction may be indicated by a particular number of sensor units 102 being triggered concurrently. The sensor units 102 may be triggered simultaneously or sequentially. That is, a dryer malfunction may be indicated when multiple sensor units 102 are simultaneously transmitting their serial number to the DPS 106 regardless of when each sensor actually began the transmission. For example, a dryer 104 malfunction may be indicated when three sensor units 102 are triggered on the same dryer 104. The DPS 106 can send a dryer malfunction notification to the user computing device 110 in response to determining, that three sensor units 102 from the same dryer 104 are triggered.

In some implementations, the DPS 106 can generate a notification when a particular set of sensor units 102 installed in the same dryer 104 are triggered. The DPS 106 can correlate the serial numbers of each triggered sensor unit 102 to a dryer 104 or a registered user computing device 110 and to a particular type of sensor or installation location on the dryer 104 based on information in the sensor database at the DPS 106. For example, fire hazard may be indicated by a particular set of sensor units 102 being triggered concurrently. The sensor units 102 may be triggered simultaneously or sequentially. That is, a dryer malfunction may be indicated when multiple sensor units 102 are simultaneously transmitting their serial number to the DPS 106 regardless of when each sensor actually began the transmission. For example, a high pressure in the dryer exhaust 112 may indicate that the exhaust 112 is clogged with lint. Furthermore, the high pressure in combination with a high temperature in the exhaust 112 may indicate the potential for a lint fire in the dryer exhaust 112. Accordingly, the concurrent triggering of a pressure sensor unit and a temperature sensor unit both installed in the dryer exhaust 112 can be an indication of a potential lint fire. The DPS 106 can send a potential fire hazard notification to the user computing device 110 in response to determining, that dryer exhaust 112 pressure and temperature sensor units 102 have been triggered. In some implementations, the notification can include a selectable input that allows the user 111 to request to remotely shut down the dryer 104. The DPS 106 can interface with a control system of a dryer (e.g., a smart dryer) and send a command to the dryer's control system to shut down the dryer 104. In some implementations, the DPS 106 can be integrated into a smart dryer 104 and can directly cause the dryer 104 to shut down.

Figure 3B:
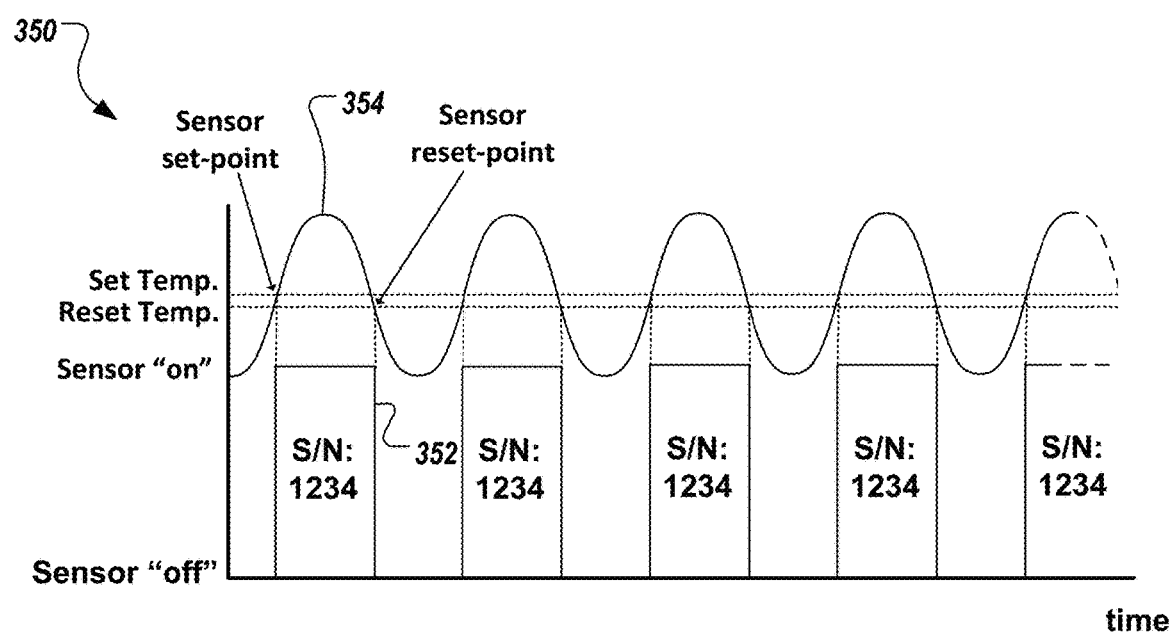

In some implementations, the DPS 106 can generate a notification based on changes in a triggering pattern of one or more sensor units 102. For example, the pattern with which a sensor unit 102 in a dryer drum 116 is triggered may be an indication of a dryer malfunction. FIGS. 3A and 3B show graphs 300, 350 of example triggering patterns 302, 352 for a sensor unit 102. Graph 300 represents a triggering pattern 302 for a dryer drum sensor unit 102 during the normal, non-malfunctioning operation of a dryer 104. Graph 350 represents a triggering pattern 352 for a malfunctioning dryer 104. The triggering patterns 302, 352 are each represented by a pattern of discrete transmission periods in which the sensor unit 102 is turned on while the corresponding sensor 124 is triggered and the sensor unit 102 is turned off when the sensor 124 is reset. Both graphs 300 and 350 also show temperature profiles 304, 354 within the dryer drum 116. In the examples shown, the temperature profile 354 for the malfunctioning dryer oscillates between high and low values more rapidly than the temperature profile 304 for the non-malfunctioning dryer. For example, a clogged dyer exhaust 112 may cause the temperature within the dryer drum 116 to rise more rapidly (e.g., profile 354) than in a drum 116 of a non-malfunctioning dryer (e.g., profile 304). Consequently, the dryer with a clogged exhaust may cycle the dryer heaters on and off more often during a drying cycle than a dryer with a clean exhaust. The sensor units 102 represent the differences in the temperature profiles 304, 354 by the timing between sensor unit transmission periods and the length of the transmission periods shown in the respective transmission patterns 302, 352.

The DPS 106 can use such changes in the transmission pattern of sensor units 102 to identify malfunctions or maintenance related problems with a dryer 104. For example, the DPS 106 can store a baseline transmission pattern for a set of sensor units 102 when they are first installed in or used in a dryer 104, for example, during a calibration run of the dryer with the sensor unit(s). The baseline transmission pattern may serve as a baseline operational profile for the dryer. In some implementations, the baseline operation profile can be obtained from a standard operation profile associated with a particular make and model dryer. For example, a statistical average baseline operating profile or a baseline operating profile based on engineering designs from a manufacturer.

The DPS 106 can use deviations from the baseline pattern to identify a potential malfunction or maintenance issue with the dryer 104, and send an appropriate notification to the user computing device 110. For example, the DPS 106 can develop and store baseline transmission patterns for sensor units 102 designed to measure dryer cycle length, humidity (e.g., dampness of clothes), airflow, temperature, pressure, or a combination thereof. The DPS 106 can compare subsequent transmission patterns from the same or similar sensors (e.g., similar sensors installed in a similar type of dryer (similar make/model)) to the stored baseline patterns to identify abnormal dryer functions or conditions, and send an appropriate notification to the user computing device 110.

In some implementation, the sensor unit 102 includes a controller 130 or processor to control the operation of the communication interface 126. The controller 130 controls the operation of the communication interface 126 in response to data received from the sensor 124. The controller 130 can store data received from the sensor 124 in the data store 128 and control the communication interface 126 to send the sensor data to the DPS 106. For example, the controller 130 can store sensor data during a dryer cycle and control the communication interface 126 to transmit the data to the DPS 106 after the dryer cycle is finished, if the sensor data does not exceed a threshold value. Sensor data may be useful even when an abnormal or hazardous condition does not occur in the dryer. For example, the DPS 106 may monitor the sensor data from the normal operation of the dryer 104 build a data profile for the dryer 104. As noted above, the data profile can provide a baseline for the normal operating characteristics of the dryer 104 and to identify deviations from the normal operating conditions in data received at a later time.

If, however, the controller 130 identifies that the sensor data does exceed a threshold value (e.g., indicating an abnormal condition in the dryer), the controller 130 can cause the communication interface to transmit the sensor data to the DPS 106 upon determining that the sensor data exceeds the threshold value. The DPS 106 can then, selectively, send an appropriate notification to the user based on one of the criteria or combinations of criteria discussed above.

Figure 2:
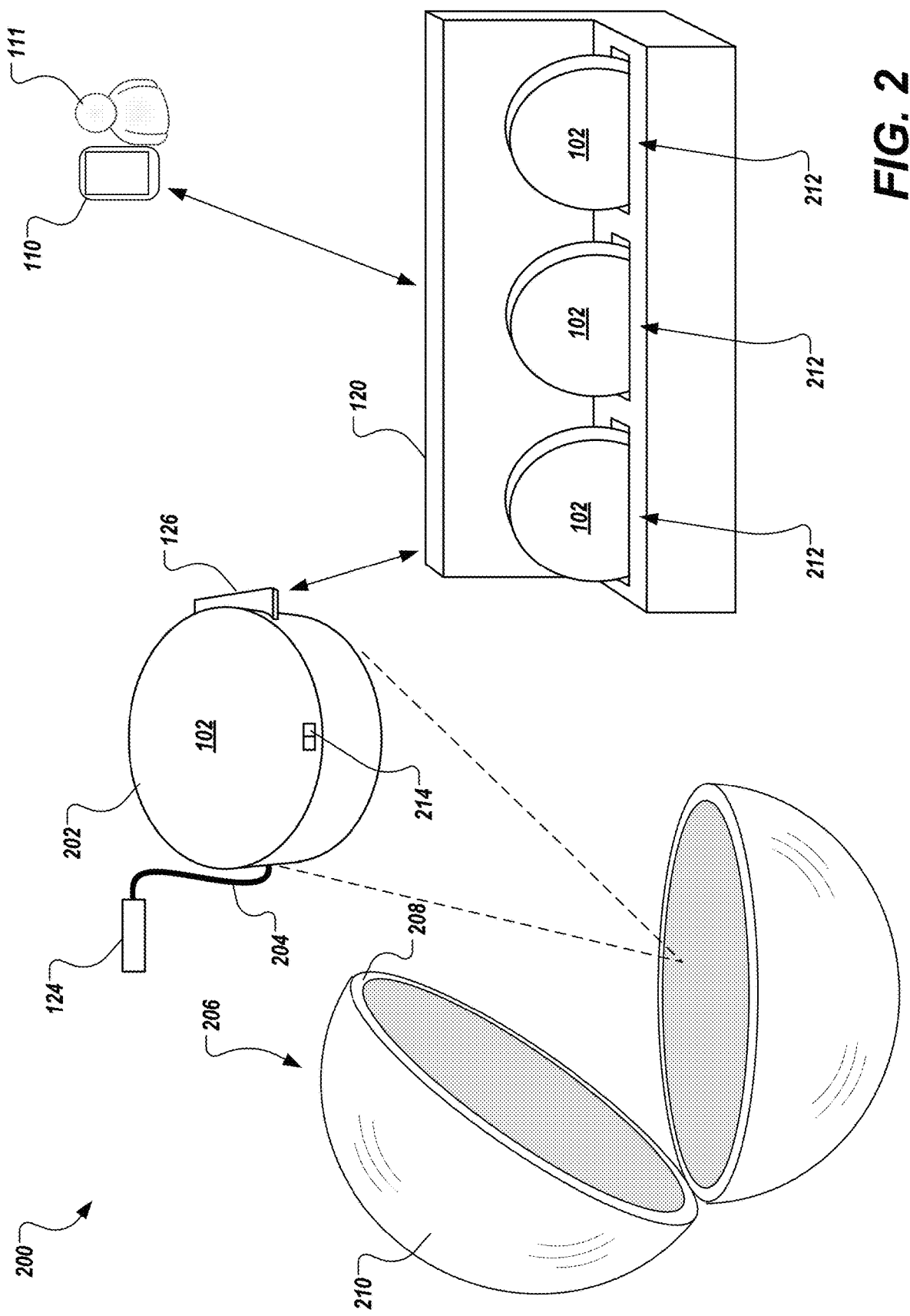
FIG. 2 depicts an example system of sensor units in accordance with implementations of the present disclosure.

FIG. 2 depicts an example system 200 of sensor units 102 in accordance with implementations of the present disclosure. The system includes multiple sensor units 102 and a sensor hub 120. Each sensor unit 102 is configured to be used or installed in a different part of the dryer 104. For example, one sensor unit 102 may be calibrated to detect high dryer exhaust temperatures and configured for installation in the dryer exhaust 112, another sensor unit 102 may be calibrated to detect high dryer exhaust pressures and configured for installation in the dryer exhaust 112, another sensor unit 102 may be calibrated to detect high dryer temperatures near a thermostat in the dryer 104 and configured to be installed in the dryer near the thermostat 114, and other sensor units 102 can be calibrated to trigger at a threshold temperature inside a dryer drum 116 and can be configured for use inside the drum 116.

A sensing unit 102 that is configured for installation in a particular region of the dryer 104 can be designed with an appropriate size or shape to be installed in the particular location. For example, a sensing unit 102 that is configured to be installed in a dryer exhaust 112 can have a sensor 124 that is located outside of a housing 202 and connected to the power source 122 and communication interface 126 by cable 204 that is capable of withstanding dryer exhaust temperatures. The sensor 124 may be installed inside the dryer exhaust pipe while the remaining portion of the sensing unit 102 (the housing 202) can be attached to the external surface of the dryer or the dryer exhaust pipe. In addition, the sensor unit 102 can include a thermoelectric power source 122 to generate power for the sensor unit 102 from the exhaust heat of the dryer 104.

In some implementations, sensing units 102 for use within a dryer drum 116 can be enclosed in a housing shaped like a dryer de-wrinkling device such as a dryer ball 206. For example, the dryer ball housing 206 can be made of rubber walls 208 with a cloth (e.g., wool or cotton) surface 210. Thus, the sensor units 102 can serve a dual purpose of fluffing a user's laundry while also monitoring the safe operation of the user's dryer 104. In addition, sensor units 102 configured for use in dryer ball housings 206 can include a kinetic energy based power source 122, such as a piezoelectric power source, thereby, generating power from the tumbling motions of the sensor unit 102 within the dryer drum 116 while the dryer 104 is operating.

The sensor hub 120 can serve as the DPS and conduct communications between the sensor units 102 and a user computing device 110, as discussed above. That is, the sensor hub 120 receives data transmissions from the sensor units 102 and, selectively, sends appropriate notifications to the user computing device 110 based on the data transmissions from the sensor units 102. In some implementations, the sensor hub 120 includes a charging stations 212 for charging batteries in the sensor units 102. The sensor units 102 can include electrical contacts 214 that interface with the charging stations 212 in the sensor hub 120 to charge the sensor unit batteries. In some implementations, the sensor hub 120 can be integrated into a dryer 104 and interface with the control system of the dryer 104 (e.g., in a smart dryer). In such implementations, the sensor hub 120 can provide direction control commands to the dryer upon detecting potentially hazardous conditions (e.g., a potential fire hazard) and automatically cause the dryer 104 to shut down.

Figure 4:
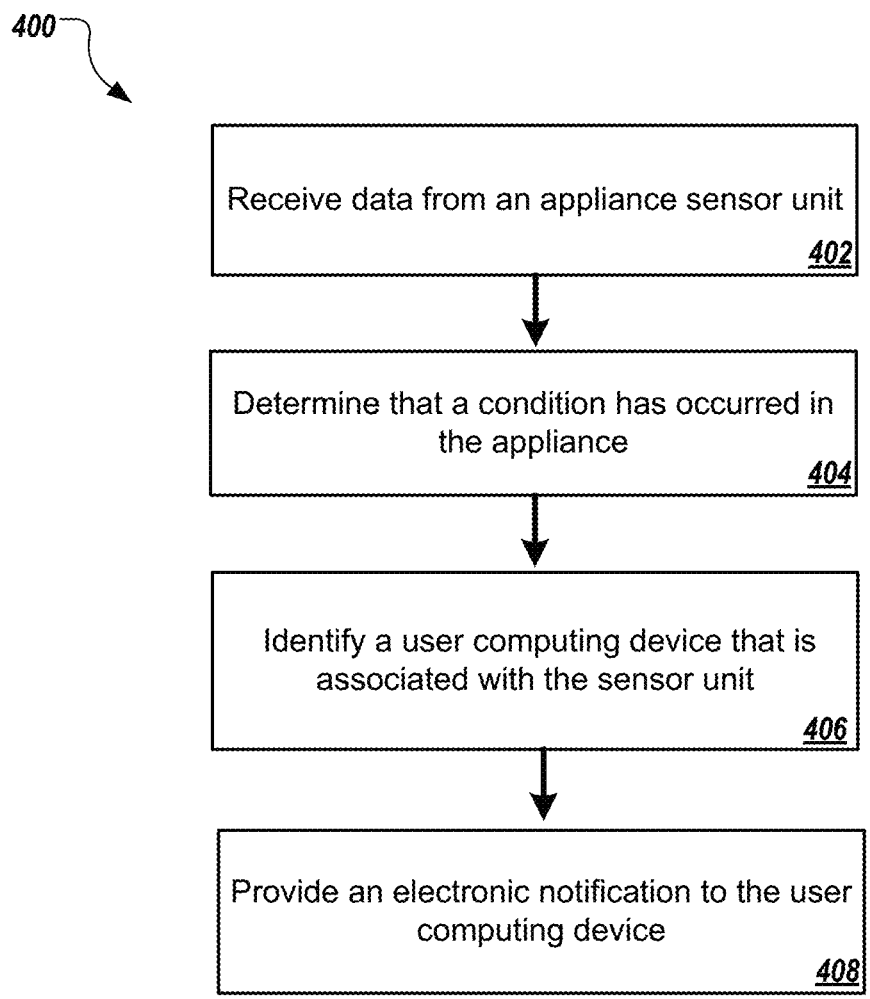
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example system 100 of FIG. 1. In some examples, the example process 400 can be provided by one or more computer-executable programs executed using one or more computing devices. For example, the example process 400, or portions thereof, can be provided by one or more programs executed by a DPS (e.g., DPS 106 of FIG. 1) such as a server system, an application on a user computing device, or a sensor hub.

The DPS receives a data transmission from an appliance sensor unit (402). The sensor unit can be one of the sensor units described above in reference to FIGS. 1 and 2. The data received in the data transmission may include only identity information to identify the sensor unit from which the data was received. For example, the data may be only a serial number of the sensor unit. In some implementations, the data may include additional information including, but not limited to, a time stamp, a set-point of the sensor in the sensor unit, a historical sensor data, or a combination thereof.

The DPS determines that a condition that has occurred in the appliance (404). The condition that has occurred in the appliance can be determined based on the fact that the data transmission was received from the sensor unit. For example, the fact that a sensor unit has turned on and is transmitting may indicate a particular condition has occurred in the appliance. The DPS can identify the particular sensor unit from which the data transmission was received based on identification information contained in the data transmission. The DPS can identify characteristics of the sensor unit by searching a database of sensor units. The database can be stored at the DPS or the DPS can access a remote database through a network. The sensor characteristics can include information including, but not limited to, sensor type (e.g., pressure, temperature, humidity, etc.), appliance condition(s) that the sensor unit is configured to monitor (e.g., dryer exhaust pressure/temperature, dryer drum temperature/humidity, or dryer thermostat temperature), a type of appliance that the sensor unit is configured to monitor (e.g., an appliance make and model), sensor unit set-points, sensor unit reset-points, identification data for a user computing device associated with the sensor unit, or a combination thereof.

Furthermore, as described above, the condition can be determined based on the type/location of a sensor unit 102 triggered, the number of sensor units 102 triggered, a particular set of sensor units 102 triggered, a pattern with which a sensor unit 102 is triggered, or any combination thereof. Based on the data transmission from one or more sensor units, the DPS can determine appliance conditions including, but not limited to, abnormal operating conditions (e.g., when the appliance is operating outside of a baseline operation profile), potentially hazardous operating conditions (e.g., when the operation of the appliance is at risk of causing a fire), and conditions requiring maintenance (e.g., when an appliance exhaust requires cleaning or when a filter requires changing).

Depending on the determined condition, the DPS selectively sends a notification to a user computing device to inform a user about the existence of the determined operating condition and, optionally, to permit the user to remotely shut down the appliance. The DPS identifies a user computing device that is associated with the sensor unit (406). For example, the DPS can identify a user computing device that is registered in association with the serial number of the sensor unit. For example, the database may be maintained by a manufacturer of the sensor units or of the appliance and may contain a list of active sensor units that are registered to a plurality of different user computing devices. That is, when a user purchases a sensor unit, the user may be required to register the sensor unit with a DPS server system to monitor the sensor unit, and by extension the operation of the user's appliance. In some cases, multiple user computing devices may be registered in association with a sensor unit. For example, a user may register multiple computing devices (e.g., a laptop, smartphone, and tablet computer) to receive notifications of the operational conditions of their appliance. In some implementations, a user computing device is identified by one or more of an e-mail address for a user, a social network account identity for a user, a user account for an appliance monitoring service, and an appliance monitoring application.

In some implementations, such as when the DPS is a sensor hub, the DPS may not need identify a user computing device from among multiple computing devices because in such an implementation the sensor hub may have a database that includes data identifying only user computing devices of the owner's. Therefore, any notifications would be sent to all of the sensor hub owner's computing device.

The DPS sends an electronic notification the identified user computing device(s) (408). The notification can include, but is not limited to, a notification that the dryer requires service, a notification that the a potentially hazardous condition exists, or a notification that the dryer is malfunctioning. In some implementations, the appliance may be a smart appliance. In such implementations, the DPS can send a command to the appliance causing the appliance to automatically shut down. The DPS can then send a notification to the user confirming that the appliance was automatically shut down in response to detecting a potentially hazardous condition. In some implementations, the notification may permit the user to remotely shut down the appliance. For example, if the appliance is a smart appliance the notification can include a user selectable input permitting the user to choose whether to remotely shut down the appliance. In response to the user's selection to shut down the appliance, the DPS can send a command to the smart appliance to shut down.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., such as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A sensor unit comprising:
    a power source;
    a communication interface; and
    a sensor coupled between the power source and the communication interface, the sensor configured to establish an electrically conductive path from the power source to the communication interface upon an occurrence of a first condition in a clothes dryer that triggers a pre-calibrated set point of the sensor, thereby, providing power to the communication interface and permitting the communication interface to transmit data indicating the condition to a computing device, and the sensor configured to remove the electrically conductive path upon an occurrence of a second condition in the clothes dryer that triggers a pre-calibrated reset point of the sensor.

2. The sensor unit of claim 1, wherein the data includes identity information of the sensor unit.

3. The sensor unit of claim 1, wherein the sensor is configured to disconnect the power source from the communication interface when the condition in the clothes dryer clears, thereby, causing the communication interface to cease transmitting the data indicating the condition.

4. The sensor unit of claim 1, wherein the power source is one of a battery, a thermo-electric power source, a piezo-electric power source, a magnetic induction power source.

5. The sensor unit of claim 1, further comprising a housing that houses the power source, the communication interface, and the sensor, the housing comprising a dryer ball, and
    wherein the sensor comprises a thermal switch or a pressure switch.

6. The sensor unit of claim 1, wherein the condition is a dryer exhaust temperature above a threshold value, a dryer exhaust pressure above a threshold value, a temperature at a dryer thermostat above a threshold value, or a temperature inside a dryer drum above a threshold value.

7. The sensor unit of claim 1, wherein the sensor has a set-point value and a reset-point value that is different from the set-point value.

8. A system comprising:
    at least one clothes dryer sensor unit comprising:
        a power source;
        a communication interface; and
        a sensor coupled between the power source and the communication interface, the sensor configured to establish an electrically conductive path from the power source to the communication interface upon an occurrence of a first condition in a clothes dryer that triggers a pre-calibrated set point of the sensor, thereby, providing power to the communication interface and permitting the communication interface to transmit data indicating the condition to a computing device, and the sensor configured to remove the electrically conductive path upon an occurrence of a second condition in the clothes dryer that triggers a pre-calibrated reset point of the sensor; and
    a monitoring system comprising at least one processor; and a data store coupled to the at least one processor having instructions stored thereon which, when executed by the at least one processor, causes the at least one processor to perform operations comprising:
        receiving, from the at least one sensor unit, a data transmission including a serial number of the at least one sensor unit;
        determining, based on having received the data transmission, that a condition has occurred in a clothes dryer;
        identifying, based on the serial number of the at least one sensor unit, a user computing device that is registered to receive notifications related to a clothes dryer that is associated with the at least one sensor unit; and
        providing, to the user computing device, an electronic notification to correct an unsafe condition in the clothes dryer.

9. The system of claim 8, wherein determining that a condition has occurred in the clothes dryer comprises identifying a pattern of multiple discrete data transmissions from a particular sensor unit each discrete data transmission including the serial number of the particular sensor unit, the pattern of discrete data transmissions indicating that the clothes dryer is operating in an abnormal pattern.

10. The system of claim 8, wherein determining that a condition has occurred in the clothes dryer comprises determining that data transmissions have been received from a predetermined number of different sensor units associated with the clothes dryer.

11. The system of claim 8, wherein determining that a condition has occurred in the clothes dryer comprises determining that data transmissions have been received from a predetermined set of different sensor units associated with the clothes dryer.

12. The system of claim 8, wherein the operations further comprise receiving, from the user computing device, a user input to shut down the clothes dryer; and causing the clothes dryer to be shut down remotely.

13. The system of claim 12, wherein causing the clothes dryer to be shut down remotely comprises sending a command to a communication interface of the clothes dryer to shut down the clothes dryer.

14. The system of claim 12, wherein the monitoring system is part of a control system of the clothes dryer and causing the clothes dryer to be shut down remotely comprises causing the control system of the clothes dryer to shut down the clothes dryer.

15. A monitoring system for clothes dryers, the system comprising:
   at least one clothes dryer sensor unit comprising:
      a power source;
      a communication interface; and
      a sensor coupled between the power source and the communication interface, the sensor configured to establish an electrically conductive path from the power source to the communication interface upon an occurrence of a first condition in a clothes dryer that triggers a pre-calibrated set point of the sensor, thereby, providing power to the communication interface and permitting the communication interface to transmit data indicating the condition to a computing device, and the sensor configured to remove the electrically conductive path upon an occurrence of a second condition in the clothes dryer that triggers a pre-calibrated reset point of the sensor; and
   a monitoring hub comprising:
      a charging connection for the at least one clothes dryer sensor unit;
      a communication interface;
      at least one processor coupled to the communication interface; and
      a data store coupled to the at least one processor having instructions stored thereon which, when executed by the at least one processor, causes the at least one processor to perform operations comprising:
         receiving, from at least one sensor unit, a data transmission including a serial number of the at least one sensor unit;
         determining, based on having received the data transmission, that a condition has occurred in a clothes dryer;
         identifying, based on the serial number of the at least one sensor unit, a user computing device that is registered to receive notifications related to a clothes dryer that is associated with the at least one sensor unit; and
         providing, to a user computing device registered to receive notifications from the monitoring hub, an electronic notification to correct an unsafe condition in the clothes dryer.

16. The monitoring hub of claim 15, wherein determining that a condition has occurred in the clothes dryer comprises identifying a pattern of multiple discrete data transmissions from a particular sensor unit each discrete data transmission including the serial number of the particular sensor unit, the pattern of discrete data transmissions indicating that the clothes dryer is operating in an abnormal pattern.

17. The monitoring hub of claim 15, wherein determining that a condition has occurred in the clothes dryer comprises determining that data transmissions have been received from a predetermined number of different sensor units associated with the clothes dryer.

18. The monitoring hub of claim 15, wherein determining that a condition has occurred in the clothes dryer comprises determining that data transmissions have been received from a predetermined set of different sensor units associated with the clothes dryer.

19. The monitoring hub of claim 15, wherein the operations further comprise receiving, from the user computing device, a user input to shut down the clothes dryer; and causing the clothes dryer to be shut down remotely.

20. The monitoring hub of claim 19, wherein causing the clothes dryer to be shut down remotely comprises sending a command to the communication interface of the clothes dryer to shut down the clothes dryer.

* * * * *